United States Patent [19]

Nillson et al.

[11] Patent Number: 5,226,826
[45] Date of Patent: Jul. 13, 1993

[54] IC CARD CONNECTOR

[75] Inventors: Uno Nillson, Saltsjo-Boo, Sweden; Peter G. Roche, Corbally Limerick, Ireland

[73] Assignee: Molex Incorporated, Lisle, Ill.

[21] Appl. No.: 901,053

[22] Filed: Jun. 19, 1992

[30] Foreign Application Priority Data

Jun. 28, 1991 [EP] European Pat. Off. ........ 91110707.6

[51] Int. Cl.⁵ .............................................. H05K 1/00
[52] U.S. Cl. .......................................... 439/72; 439/73
[58] Field of Search ............................ 439/68–73, 439/329, 330, 331, 341, 372, 488, 489, 490, 525

[56] References Cited

U.S. PATENT DOCUMENTS

| 4,560,216 | 12/1985 | Egawa | 439/72 |
| 4,713,022 | 12/1987 | Pfaff | 439/331 |
| 4,717,347 | 1/1988 | Babow et al. | 439/72 |
| 4,761,140 | 8/1988 | Geib | 439/331 |
| 5,006,689 | 3/1991 | Iskizuka et al. | 439/73 |

Primary Examiner—David L. Pirlot
Attorney, Agent, or Firm—Stacey E. Caldwell; Stephen Z. Weiss

[57] ABSTRACT

An IC card connector is provided for connecting an IC card having a terminal array to external equipment. The connector includes a base member having a plurality of electrically conductive contacts exposed on one side of the base member for engaging the terminal array of the IC card. A cover is hinged to the base member for movement toward and away from the one side of the base member. The cover has a receptacle for securing the IC card thereon for movement therewith, whereby closing of the cover onto the base member effects engagement of the IC card terminal array with the contacts on the cover.

17 Claims, 3 Drawing Sheets

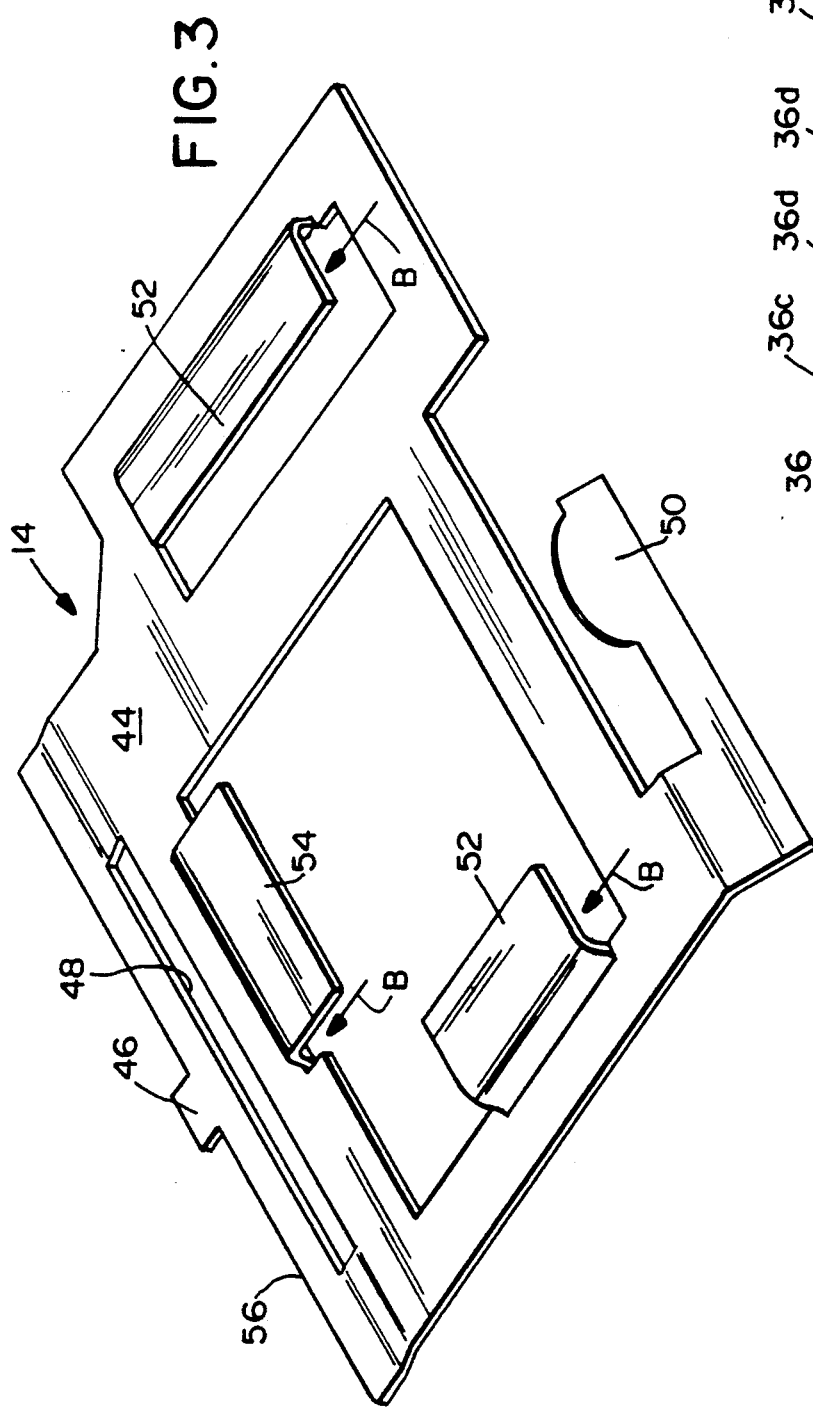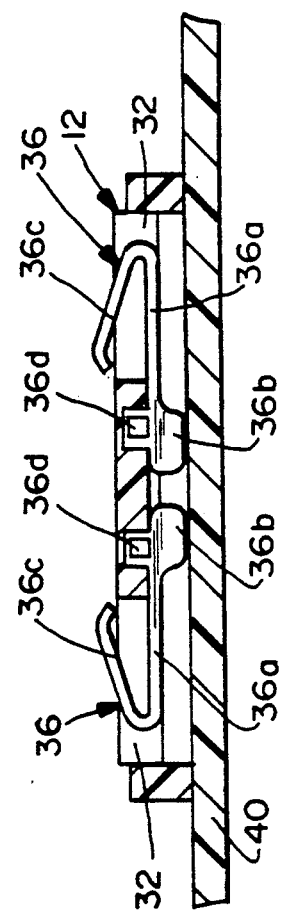

IC CARD CONNECTOR

FIELD OF THE INVENTION

This invention generally relates to the art of electrical connectors and, particularly, to an IC card connector for connecting an IC card in a IC card reader system or the like.

BACKGROUND OF THE INVENTION

IC cards have been developed and contain IC's (integrated circuits) including memory circuits, such as RAMs (random access memories), and control circuits, such as CPUs (central processing units). The IC cards normally include a terminal array for connection through a card reader system to external equipment such as a printed circuit board. The connector usually includes some form of IC card socket and a plurality of electrodes or contacts exposed in the socket for engaging the terminal array of the IC card. The card is inserted and removed from the socket, and the connector contacts are resilient or comprise springy contacts for yieldably engaging the terminal array of the card when the card is inserted into the socket.

With the ever-increasing miniaturization of IC cards and their respective connectors, various problems continue to arise. For instance, the very handling of the miniature IC cards is difficult, and proper positioning of the cards in the connector presents corresponding problems when the card is inserted into and removed from the card-receiving cavity or other receptacle means of the connector. In addition, the terminal array on the card can become contaminated or soiled which can result in incomplete connections between the terminal array on the card and the contacts of the connector which, in turn, results in incomplete or deficient connections to the external equipment. In fact, the integrated circuits can be harmed or even destroyed by static electricity resulting from contaminated circuits when the terminal array on the card comes in contact with the hand of a user when the user attempts to position the tiny card into the socket of the connector in proper engagement with the connector contacts.

In addition, in some applications, it is desirable to provide EMI/RF shielding for the IC card and its terminal array. Still further, with the ever-increasing miniaturization of IC cards and their respective connectors, it is desirable to provide very thin envelopes for the overall IC card connector assemblies. Also, providing shielding means for the IC cards often increases the overall dimensions of the assemblies undesirably.

This invention is directed to solving the above problems in a miniature IC card connector which is extremely simple to manufacture and assemble.

SUMMARY OF THE INVENTION

An object, therefore, of the invention is to provide a new and improved IC card connector for connecting an IC card having a terminal array, in an IC card reader system or the like.

In the exemplary embodiment of the invention, the IC card connector includes a base member having a plurality of electrically conductive contacts exposed on one side thereof. A cover is hinged to the base member for movement toward and away from the one side. The cover has receptacle means for securing the IC card thereon for movement therewith, whereby closing the cover onto the base member effects engagement of the IC card terminals with the contacts on the base member.

In the preferred embodiment of the invention, the base member is provided as a unitarily molded component of dielectric material such as plastic or the like. The cover is fabricated of metal material to provide shielding for the IC card. The cover is fabricated in one-piece from stamped and formed sheet metal material. The cover has flanges providing means for slidably receiving the IC card in an edge-wise fashion.

The card reader system may include a printed circuit board and, in such an application, the base member is illustrated herein as including means for mounting the base member to the printed circuit board with the contacts engageable with circuit traces on the board. The contacts have resilient portions exposed on the one side of the base member for engaging the terminal array of the IC card.

Another feature of the invention is the provision of complementary interengaging latch means between the unitarily molded base member and the one-piece cover to hold the cover in a closed position with the IC terminal array in engagement with the contacts on the base member.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 3 is a perspective view of the cover of the connector;

FIG. 5 is a vertical section taken generally along line 5—5 of FIG. 1.

DETAILED DESCRIPTION OF THE PREFERRED EMBODIMENT

Figure 1:
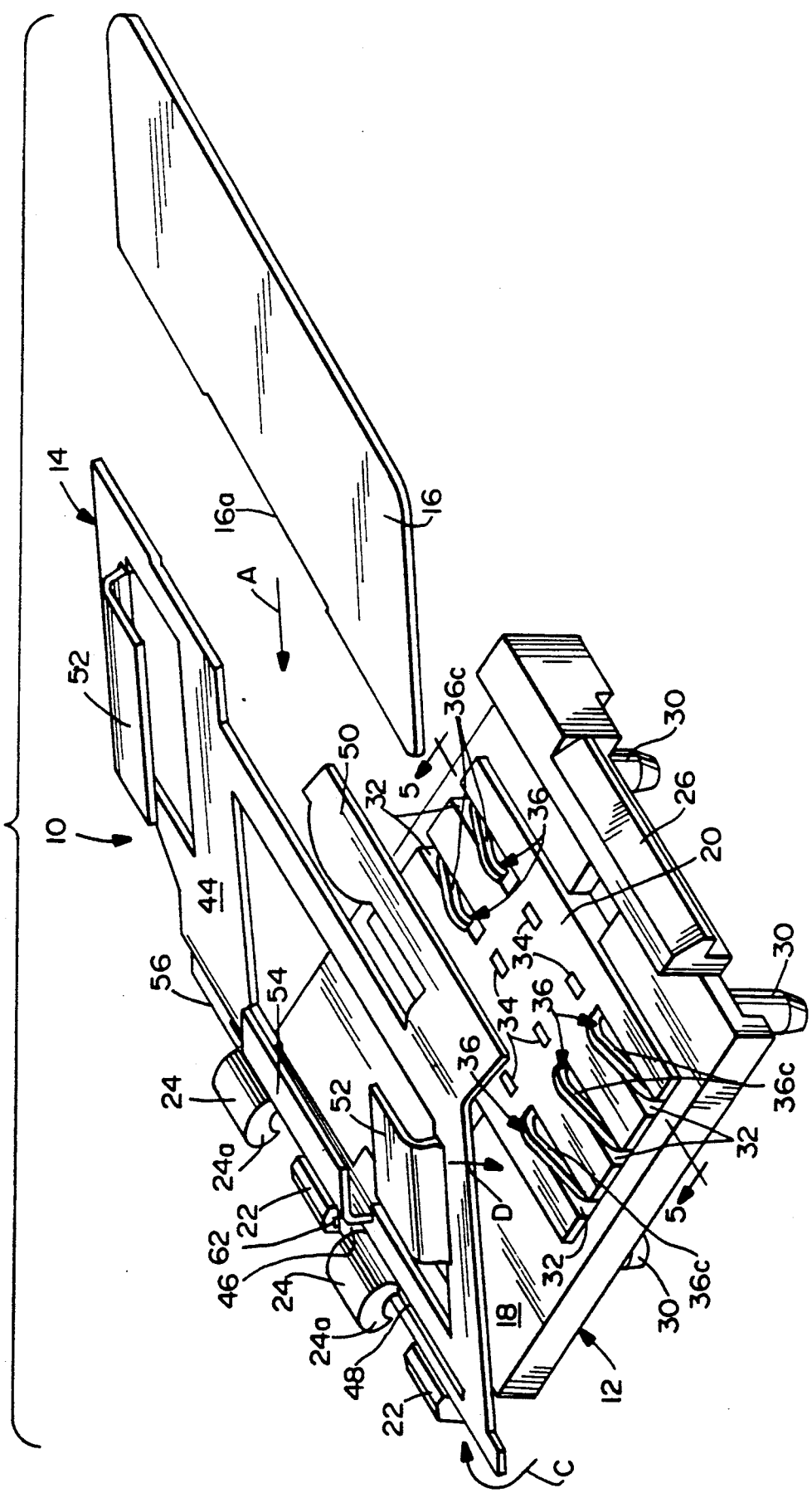
FIG. 1 is a perspective view of an IC card connector embodying the concepts of the invention, and illustrating an IC card about to be inserted edge-wise into the cover of the connector.

Referring to the drawings in greater detail, and first to FIG. 1, the concepts of the invention are embodied in an IC card connector, generally designated 10, which is extremely simple and includes only two basic components, namely a base member, generally designated 12, and a cover, generally designated 14. As described in greater detail hereinafter, FIG. 1 shows an IC card 16 about to be inserted into cover 14 in the direction of arrow "A". The IC card is a miniature card of conventional or known construction and includes a terminal array on the bottom side thereof (not visible in FIG. 1).

Figure 2:
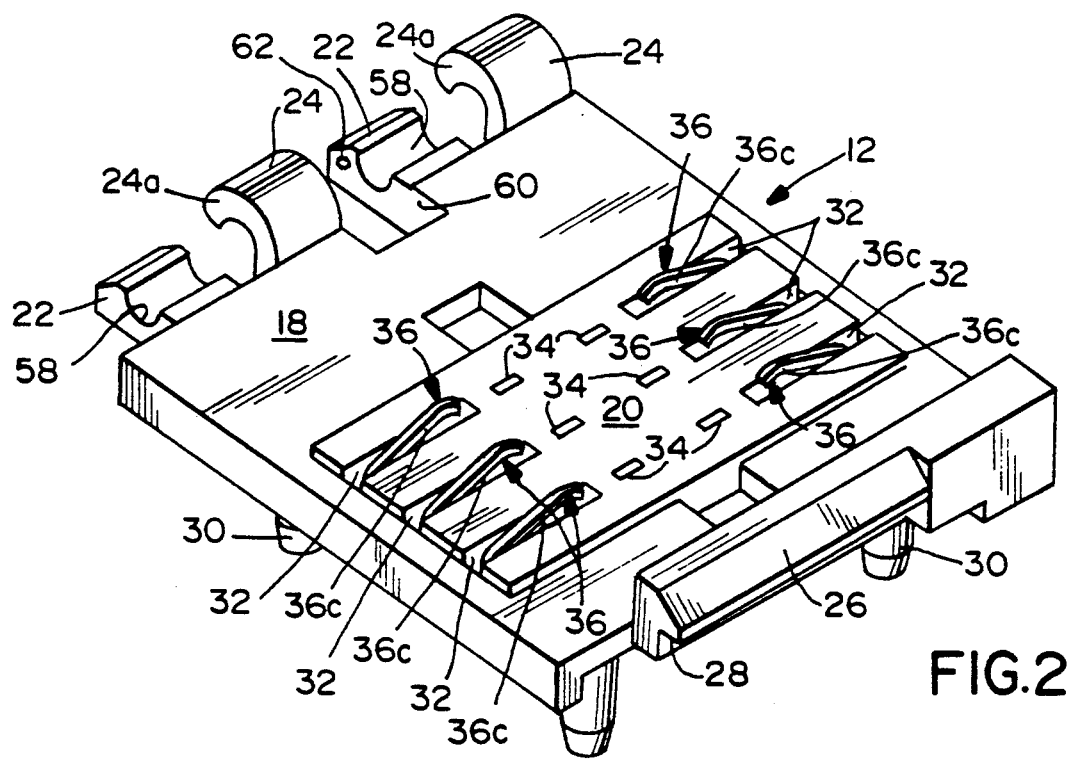
FIG. 2 is a perspective view of the base member of the connector, showing contacts on the base member exposed on the top side thereof.

Referring to FIG. 2 in conjunction with FIG. 1, base member 12 includes a generally flat base portion 18 having a raised area 20. Hinge means, including a pair of rearwardly projecting trough portions 22 and hook portions 24, are provided at the rear of base portion 18. A latch flange 26 projects forwardly of base portion 18 and defines a latch shoulder 28. A plurality of mounting pegs 30 depend from the underside of base portion 18 for mounting in appropriate mounting holes in a printed circuit board, for instance. Lastly, a plurality of slots 32 and a plurality of through apertures 34 are provided for mounting a plurality of contacts, generally designated 36, on base member 12, as will be described in greater detail hereinafter, whereby portions of the contacts are exposed on the top side of the base member as can be seen in FIGS. 1 and 2.

Base member 12, including all of the elements thereof described above, including trough portions 22, hook portions 24, latch flange 26, and mounting pegs 30, comprises a unitarily molded single component of dielectric material, such as plastic or the like.

Figure 4:
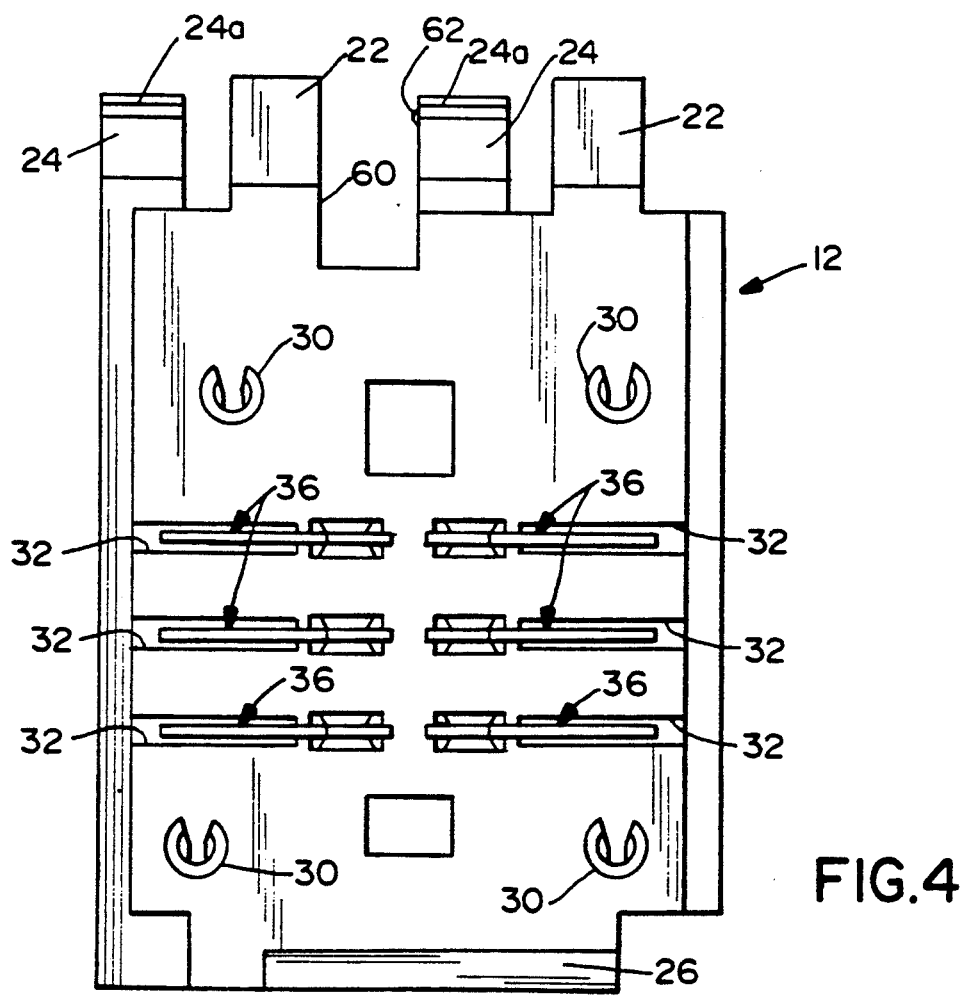
FIG. 4 is a bottom plan view of the base member.

Referring to FIGS. 4 and 5 in conjunction with FIGS. 1 and 2, FIG. 4 shows the bottom of base member 12 and FIG. 5 shows a section through the base member taken generally along line 5—5 of FIG. 1. These figures best illustrate the configuration and mounting of contacts 36 on the base member. More particularly, it can be seen that each contact 36 includes a generally horizontal leg 36a terminating at one end in a foot 36b The contacts are formed with a resilient or springy leg 36c which is bent back over horizontal leg 36a whereby the resilient leg projects upwardly beyond the top surface of the base member so as to be exposed on the top side thereof. Each contact 36 is mounted on the base member by a mounting flange or boss portion 36d which is press-fit into a respective aperture 34 in the base member. The base member is shown in FIG. 5 as being mounted to a printed circuit board 40 by means of mounting pegs 30 inserted through appropriate mounting holes in the printed circuit board. When contacts 36 are properly mounted within base member 12, and the base member is properly mounted to printed circuit board 40, as illustrated in FIG. 5, feet 36b of the contacts are maintained in surface contact with appropriate circuit traces on the top of the printed circuit board.

Referring to FIG. 3 in conjunction with FIG. 1, cover 14 is a one-piece component fabricated of either stamped and formed sheet metal material or molded dielectric material, such as plastic or the like. The cover includes a thin, flat body 44, a guide tongue 46 projecting from the rear of the body, a rear slot 48 extending transversely of the body, a latch arm 50 disposed at the front of the body, a pair of side flanges 52 formed to be spaced slightly above the top of the body and a similar rear flange 54. Flanges 52 and 54 all project toward the middle of the body to define receptacle means, as indicated by arrows "B" for IC card 16 between the top of body 44 and the undersides of flanges 52 and 54.

In assembly of cover 14 to base member 12, the rear edge 56 of the cover is seated into trough areas 58 (FIG. 2) of trough portions 22 of base member 12, with the cover projecting rearwardly away from the base member. The cover then is pivoted forwardly in the direction of arrow "C" (FIG. 1), and distal ends 24a of hook portions 24 of the base member will move into slot 48 of the cover, capturing the cover onto the hook portions. Lateral positioning of the cover relative to the base member is facilitated by guide tongue 46 on the cover positioned within a rearwardly opening recess 60 (FIG. 2) of the base member. An edge of guide tongue 46 will contact one side of protrusion 61 to maintain the cover 14 in the preload position which appears in FIG. 1.

Cover 14, being assembled to base member 12 as shown in FIG. 1, provides a carrier for IC card 16 whereby the cover itself is the moving medium for the IC card, rather than having to position the card in a receptacle of the base member by manual manipulation, as is prevalent in the prior art. In particular, an operator simply grasps the IC card by its edges, to preclude the possibility of touching the terminal array of the card, and inserts the card edge-wise in the direction of arrow "A" beneath and between side flanges 52 of the cover in the preload position as shown in FIG. 1 until a leading edge 16a of the IC card becomes seated beneath rear flange 54 of the cover.

After force is placed on cover 14 necessary for guide tongue 46 to ride over protrusion 61, cover 14 and its received IC card 16 then can be closed downwardly onto the top of base member 12, as indicated by arrow "D" in FIG. 1, without any further touching of the IC card by an operator. When completely closed, the terminal array on the underside of the IC card engage resilient legs 36c of selective ones of contacts 36, the resilient legs being springy and yieldable to maintain a secure contact engagement between the terminals and the contacts. When fully closed, latch arm 50 at the front of cover 14 snaps behind shoulder 28 of latch flange 26 of the base member to latch the cover in fully closed condition and with the IC card terminal array securely terminated to contacts 36. The latch arm is cantilevered, as shown, and its resiliency draws the cover into secure engagement with hook portions 24 of the base member.

In order to open cover 14 and move the IC card therewith away from base member 12 and contacts 36, an operator simply releases latch arm 50 from beneath shoulder 28 of latch flange 26, and the connector is opened, whereupon IC card 16 can be removed, with all of these manipulations being effected by the operator touching only the edges of the IC card.

From the foregoing, it can be seen that an extremely simple IC card connector has been provided by only two basic components, namely base member 12 and cover 14, along with the contacts 36 mounted on the base member. An IC card is positioned on the cover for movement therewith to eliminate touching the IC card except at its edges as it is inserted between and beneath flanges 52 and 54 of the cover. No touching whatsoever is required of the IC card to move the card into engagement with contacts 36 and/or mount the IC card onto the base member.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An IC card connector for connecting an IC card having a terminal array, comprising:
   a base member including a plurality of electrically conductive contacts having resilient legs adapted to be moved toward and away from the base, said resilient legs exposed on one side of the base member for engaging the terminal array of the IC card; and a cover hinged to the base member for movement toward and away from said one side thereof, the cover fabricated in one piece having receptacle means for securing the IC card thereon for movement therewith, said receptacle means comprising at least two L-shaped arms adapted to be located at opposite edges of said IC card when said card is fully inserted in said receptacle means, said arms extending first generally perpendicular from one surface of the cover and thereafter extending over said opposite edges of said IC card, whereby closing of the cover onto the base member effects engagement of the IC card terminal array with the resilient legs of the contacts on the base member.

2. The IC card connector of claim 1 wherein said base member includes means for mounting the base member to the printed circuit board with said resilient legs engageable with circuit traces on the board.

3. The IC card connector of claim 1 wherein said cover is fabricated of metal material to provide shielding for the IC card.

4. The IC card connector of claim 1 wherein said base member is unitarily molded of dielectric material.

5. The IC card connector of claim 1, including complementary interengaging latch means between base member and the cover to hold the cover in a closed position with the IC terminal array in engagement with the resilient legs.

6. The IC card connector of claim 1 wherein said receptacle means comprise means for slidably receiving the IC card.

7. An IC card connector for connecting an IC card having a terminal array to external equipment comprising:

a base member including a plurality of electrically conductive contacts having resilient legs adapted to be moved toward and away from the base for engagement by the terminal array of the IC card; and a cover mounted on the base member for movement toward and away from one side thereof, the cover fabricated in one piece including means for mounting an IC card thereon for movement therewith, said mounting means comprising at least two L-shaped arms adapted to be located at opposite edges of said IC card when said card is fully inserted in said mounting means, said arms extending first generally perpendicular from one surface of the cover and thereafter extending over said opposite edges of said IC card, whereby closing of the cover onto the base member effects engagement of the IC card terminal array with the resilient legs of the contacts on the base member.

8. The IC card connector of claim 7 wherein the external equipment includes a printed circuit board, and said base member includes means for mounting the bas member to the printed circuit board with said resilient legs engageable with circuit traces on the board.

9. The IC card connector of claim 7, including complementary interengaging latch means between base member and the cover to hold the cover in a closed position with the IC terminal array in engagement with the resilient legs.

10. The IC card connector of claim 7 wherein said cover is fabricated of metal material to provide shielding for the IC card.

11. The IC card connector of claim 7 wherein said base member is unitarily molded of dielectric material.

12. An IC card connector for connecting an IC card having a terminal array, comprising:

a generally flat base member unitarily molded of dielectric material and including a plurality of electrically conductive contacts having resilient legs adapted to be moved toward and away from the base, said resilient legs exposed on one side of the base member for engaging the terminal array of the IC card; and a thin cover fabricated in one-piece from stamped and formed sheet metal material, the cover being hinged to the base member for movement toward and away from said one side thereof, and the cover having receptacle means for securing the IC card thereon for movement therewith, said receptacle means comprising at least two L-shaped arms adapted to be located at opposite edges f said IC card when said card is fully inserted in said receptacle means, said arms extending first generally perpendicular from one surface of the cover and thereafter extending over said opposite edges of said IC card, whereby closing the cover onto the base member effects engagement of the IC card terminal array with the resilient legs.

13. The IC card connector of claim 12 wherein said base member includes integrally molded means for mounting the base member to the printed circuit board with said resilient legs engageable with circuit traces on the board.

14. The IC card connector of claim 12, including complementary interengaging latch means between base member and the cover to hold the cover in a closed position with the IC terminal array in engagement with the contacts on the base member.

15. The IC connector of claim 14 wherein said latch means include a rigid latch portion on the unitarily molded base member and a resilient latch arm on the stamped and formed cover.

16. The IC card connector of claim 12 wherein said receptacle means comprise means for slidably receiving the IC card.

17. The IC card connector of claim 16 wherein said receptacle means comprise a plurality of stamped and formed flanges projecting inwardly of the cover and beneath which the IC card is slidably received.

* * * * *